March 3, 1970  W. R. McKILLIP  3,498,157
TOOL FOR FIXING CUTTING TIPS TO SAWS
Filed May 3, 1968
FIG. 1.
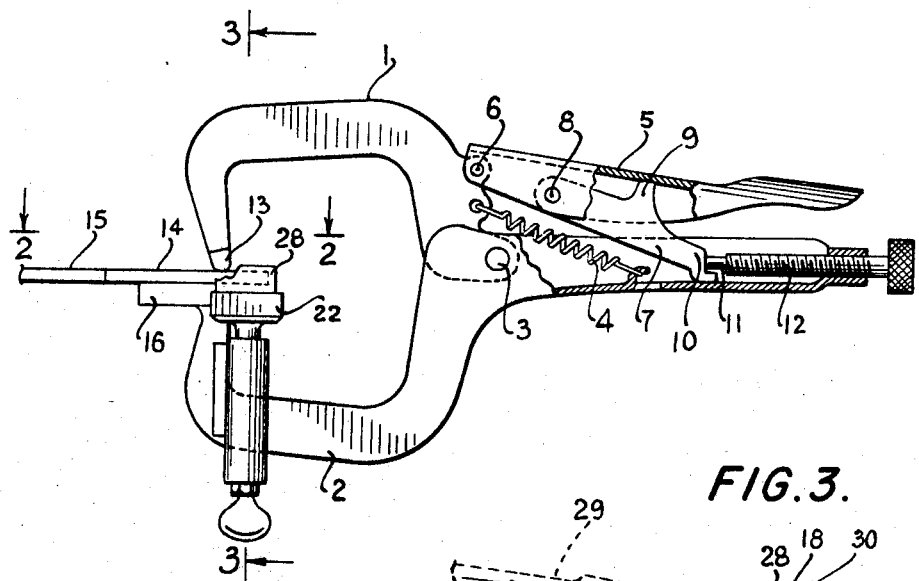
FIG. 2.
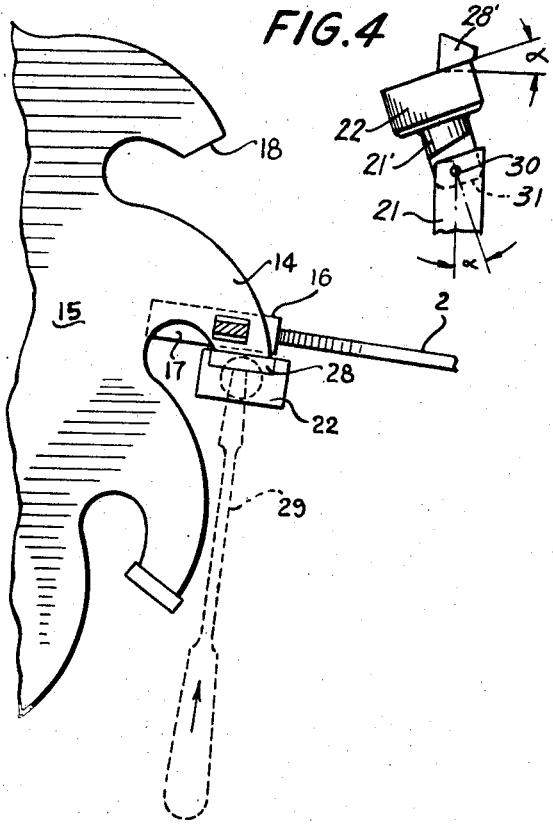
FIG. 3.
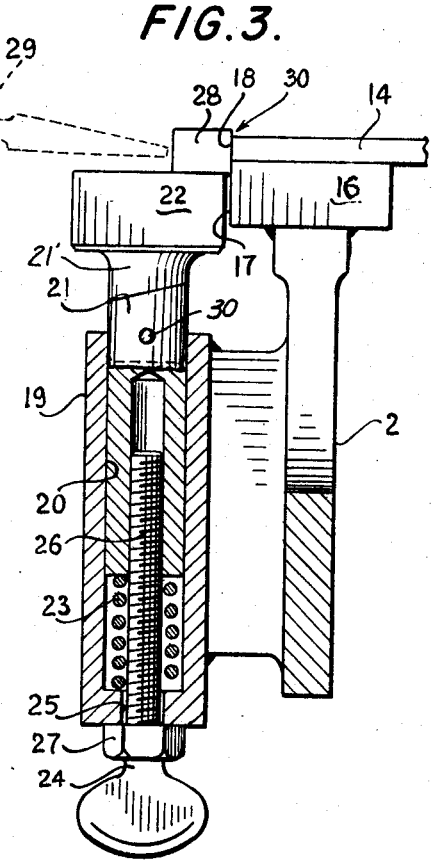
FIG. 4.
INVENTOR
William R. McKillip United States Patent Office 3,498,157
Patented Mar. 3, 1970

3,498,157
TOOL FOR FIXING CUTTING TIPS TO SAWS
William R. McKillip, Portland, Oreg., assignor, by mesne assignments, to James Talcott Inc., New York, N.Y., a corporation of New York
Filed May 3, 1968, Ser. No. 726,360
Int. Cl. B23d *63/00;* B25b *7/00, 7/02*
U.S. Cl. 76—80         3 Claims

ABSTRACT OF THE DISCLOSURE

A tool for holding a cutting tip to the saw blade body during the fixing of the tip to the blade having upper and lower jaws biased apart and a pair of handles for gripping the tool and forcing the jaws together. The lower jaw has attached thereto a table support for the cutting tip so as to adjust it and hold it in proper position while it is brazed or otherwise affixed to the saw tooth.

BACKGROUND OF THE INVENTION

This invention relates to tools for fixing cutting tips to saws.

More particularly, the invention is concerned with the fixing of carbide cutting edges to the teeth of disc saws.

The general object of the invention is to provide a tool of the character indicated which can be attached to the saw itself quickly and provide for holding the cutting edge in proper relation to the tooth while it is being brazed or otherwise fixed thereto.

A device embodying the invention in a preferred form will now be described with reference to the accompanying drawings, and the features forming the invention will then be pointed out in the appended claims.

BRIEF DESCRIPTION OF THE DRAWINGS

In the drawings:

FIG. 1 is a side elevation of a tool according to the invention, showing the same in operating position on the edge of a saw;

FIG. 2 is an enlarged partial plan view looking in the direction of the arrows 2—2 of FIG. 1;

FIG. 3 is a section of the line 3—3 of FIG. 1; and

FIG. 4 is a partial view of FIG. 3 showing the table in its tilted position.

DESCRIPTION OF THE PREFERRED EMBODIMENT OF THIS INVENTION

The tool comprises a clamp having opposed jaws 1 and 2 and pivotally hinged together at 3. A spring 4 tends to hold the jaws apart, while a toggle mechanism is provided for urging them together. This mechanism comprises an operating lever 5 hinged to the upper jaw element 1 at 6 and a toggle arm 7 hinged to the operating lever 5 and 8. The toggle arm 7 has a somewhat elevated abutment 9 engaging the lever 5, and its end 10 engages an adjustable abutment 11 carried by a screw 12 threadably mounted in the end of the jaw 2. In the approximate position of FIG. 1, the pivotal axes of the hinges 6 and 8 are aligned with the abutment 11, so that the upper jaw 1 is held down firmly against the lower jaw 2. The clamp may be released by merely lifting the operating lever 5 so as to break the toggle.

The clamp as thus far described is the same as that shown and described in Peterson Patent No. 2,641,149 and its details form no part of the present invention. Other forms of clamp adapted to quick attachment and release may be substituted where desired.

The upper jaw 1 terminates in a rounded nose 13, which, as shown in FIG. 1, engages against the upper surface of a tooth 14 of the saw 15. As will be understood, the saw 15 is circular in form and provided with a central aperture (not shown) for holding it on a rotating driven shaft for cutting or for holding it in a stationary vertical arbor for attaching the tips to its teeth.

The lower jaw 2 has a flat table 16 which is rigidly secured to the jaw 2 and engages a substantial amount of the undersurface of the saw tooth, so as to locate the clamp firmly in position on the saw tooth when clamped thereto. The edge 17 of table 16 may be registered with edge 18 (to which the cutting tip is attached) of the saw tooth 14. As indicated in FIG. 3, the jaw 2 has mounted on it a member 19 having an axial bore 20 which slidably receives the plunger 21. Hinged to plunger 21 at pin 30 is a member 21' having a head 22 forming a table adjacent the table 16. The member 21' has a web portion 31 which fits into a slot on plunger 21 and secured therein by pin 30. The member 21' can be tilted away from the plunger 21 so that the upper surface of the tabel 22 is at an angle to the upper surface of table 16 so as to support a tip 28' having a clearance angle α. FIG. 4 shows the table 22 in its tilted position with angle α greatly exaggerated. With the axis of the member 21' aligned with the axis of plunger 21, as shown in FIG. 3, the upper surface of tables 16 and 22 are parallel so that a tip 28, having parallel sides, can be supported by table 22.

Bore 20 contains a spring 23 for urging the plunger 21 and table 22 upwardly. Thumb screw 24 passes through a smaller bore 25 in the lower end of member 19 and the threaded shank 26 of this thumb screw is received within a threaded bore within the plunger 21. Abutment 27 on the thumb screw engages against the bottom of the member 19. By adjusting the thumb screw, table 22 may be drawn downwardly against the pressure of spring 23, so as to locate the upper surface of table 22 at any desired level with respect to the upper surface of table 16. The carbide tip 28 or 28', as indicated in the figures, is supported on the table 22 either in its aligned or tilted position during its attachment to the saw tooth body.

In using the device of the present invention to attach tips with parallel sides to a saw, the saw disc 15 is supported in a horizontal plane. The clamp is then affixed to the tooth to be fitted with a cutting edge, in the manner shown in the figures. The abutment screw 12 having once been adjusted with relation to the thickness of the saw disc, this operation is an instantaneous one. The thumb screw 24 is now utilized to place the table 22 at the proper level with respect to table 16 and the saw disc and the carbide or other cutting tip 28 is placed in position. A rod 29, the tip of which is indicated in FIG. 3 in dotted lines, may be held in one hand by the workman while he applies the brazing material and heat at the location indicated by the arrow 30 with the other.

For attaching tips with a clearance angle, the table 22 is tilted about pin 30 in a counterclockwise direction to an angle from the verticle equal to the clearance angle α. The same procedure for setting the tip in place, as described above with respect to tips having parallel sides, is then followed.

In addition to being tiltably mounted on plunger 21 so as to be adjustable for tips having a clearance (circumferential) angle, table 22 can also be swiveled about the axis of plunger 21 by rotating the plunger by means of thumb screw 24 so that it can support the tip 28' at a radial angle to the saw body 15, while also in the tilted position.

The device of the present invention provides a very compact and inexpensive mechanism for affixing cutting tips to saw teeth in a rapid and economical manner.

While the invention has been described and illustrated with respect to a certain preferred embodiment which

What is claimed is:

1. A tool for use in affixing cutting tips to saw teeth, comprising a quick release clamp for attachment to the tooth of a saw, the said clamp comprising an upper jaw for engagement with the upper surface of a tooth, a lower jaw element having a table for engaging the undersurface of the tooth, and an adjustable member mounted adjacent to said lower jaw element adjustably supporting a second table tiltably mounted on said member, means for adjusting the vertical position of the said second table, whereby a cutting tip may be supported by the second table and adjusted into proper position for attachment with relation to the tooth, and be attached to the tooth while so supported.

2. The tool for use in affixing cutting tips to saw teeth according to claim 1 wherein said means for adjusting the vertical position of said second table comprises a plunger having a threaded bore in its lower end, said plunger being slidably mounted in a bore in said adjustable member and attached at its upper end to the underside of said second table, biasing means for urging said plunger and said second table attached thereto upwards, and screw means engaging said threaded bore in said plunger for limiting upward travel of said plunger and thereby adjusting the vertical position of said second table.

3. The tool for use in affixing cutting tips to saw teeth according to claim 1 wherein the upper surface of said second table is maintained in parallelism with the upper surface of said first table and to the surface of said saw tooth for affixing a tip having parallel sides to the tooth, and wherein the surface of said second table is tilted to an angle equal to the clearance angle for affixing a tip having a clearance angle to the tooth.

References Cited
UNITED STATES PATENTS 2,641,149   6/1953   Petersen _____ 81—380

BERNARD STICKNEY, Primary Examiner

U.S. Cl. X.R.

81—5.1, 418; 269—305, 310